(No Model.)

J. CABOT.
GAS PURIFIER SCREEN OR GRID.

No. 292,984. Patented Feb. 5, 1884.

Witnesses.
S. N. Piper.
E. B. Pratt.

Inventor,
John Cabot,
by R. H. Eddy atty.

UNITED STATES PATENT OFFICE.

JOHN CABOT, OF LAWRENCE, MASSACHUSETTS.

GAS-PURIFIER SCREEN OR GRID.

SPECIFICATION forming part of Letters Patent No. 292,984, dated February 5, 1884.

Application filed November 9, 1883. (No model.)

*To all whom it may concern:*

Be it known that I, JOHN CABOT, of Lawrence, in the county of Essex, of the Commonwealth of Massachusetts, have invented a new and useful Improvement in Gas - Purifier Screens or Grids; and I do hereby declare the same to be described in the following specification, and represented in the accompanying drawings, of which—

Figure 1:
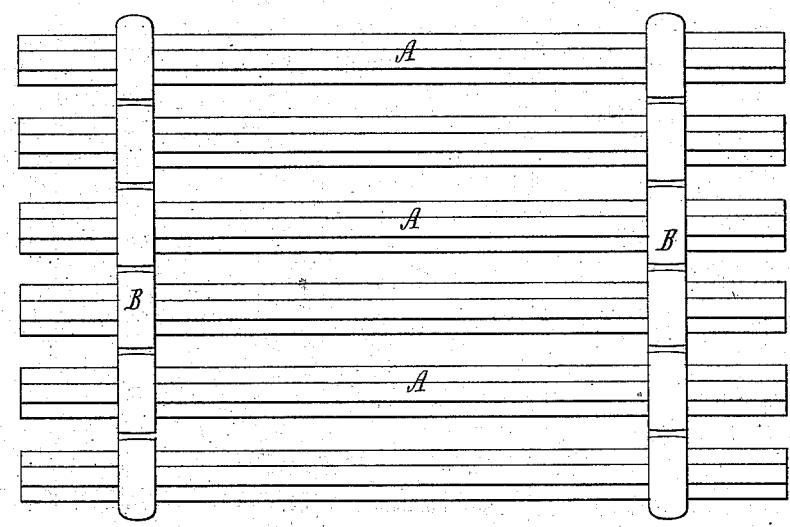
Figure 2:
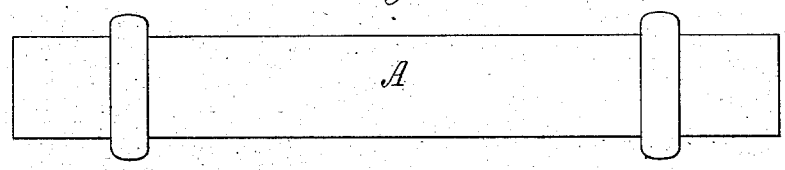
Figure 3:
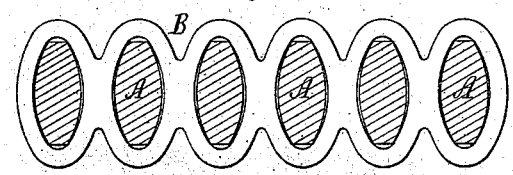
Figure 4:
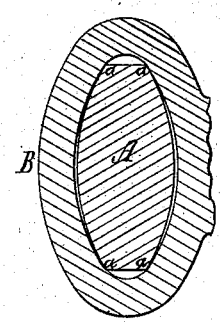

Figure 1 is a top view, Fig. 2 an edge elevation, and Fig. 3 a transverse section, of a screen of my improved kind, the nature of the invention being defined in the claim hereinafter presented. Fig. 4 is a section, on an enlarged scale, of one of the bars and the part of one of the holders through which such bar is extended.

The improvement has reference to the kind of screen or grid described in the United States Patent No. 205,727, granted July 9, 1878, to the Lawrence Gas Company, as the assignee of Hannibal H. Church, the inventor, such screen or grid being composed of a series of wooden bars and certain perforated metallic holders, each of the said bars being elliptical, or thereabout, in cross-section, as will appear by reference to the said patent.

In manufacturing these grids it has, prior to my invention, been customary to make the bar-receiving holes in the holders with transverse sections corresponding in size and shape to those of the bars. As a consequence it becomes often a difficult matter to force a bar into or extract it from its holders.

In carrying out my improvement, each bar of the screen or grid is formed with, practically speaking, linear or very narrow bearings to rest against the periphery of each of the holes for supporting it, the bar being between such bearings without contact with the periphery or boundary of the hole. Each of the holes is usually elliptical or oval in its transverse section, in which case the bar is to be prismoidal or prismatic, or to have a section more or less angular in its perimeter, in order for the bar, when down into each of the holes of the holder, to touch such in substantially linear or very narrow bearings without, between such bearings, having contact with the boundary of the hole.

Instead of making each of the holes in each of the holders a true oval or ellipse in its transverse section, such hole may have a polygonal section, and the bar to enter such hole may be cylindrical, or oval, or elliptical, so as to touch or bear in lines or in narrow bearings, the bar between such bearings being out of contact with the boundary of the hole.

In the drawings, the wooden bars are shown at A A, &c., and the two holders thereof at B, the bars being arranged parallel to each other in the said holders and at equal distances apart. Each of the bar-receiving holes of the holder is shown as elliptical in transverse section, while each of the bars is represented as elliptical, but truncated, or more or less angular in section, which causes it, when within the hole, to touch the periphery thereof only at the vertices of the angles of section—viz., at $a\ a\ a\ a$—in which case the bearings of the bar against the curved surface of the hole are substantially linear or very narrow, the bar between such bearings not being in contact with the boundary of the hole. While this construction of the bars admits of their readier application or removal relatively to the holder, it is productive of advantages in other respects, as it enables them to be forced into or extracted from the holders without being injuriously grooved by them, to cause them in practice to gather and hold the lime, they being easier cleaned of it when their surfaces are in their normal or smooth condition, or not grooved.

I do not claim a gas-purifier screen or grid made as represented in the said patent.

I claim—

As an improved manufacture, the gas-purifier screen or grid constructed with each of its wooden bars A having linear or very narrow bearings, substantially as described, in each of its supporting-holes of its holders B, without contact between such bearings with the boundary of the hole, all being substantially as set forth.

JOHN CABOT.

Witnesses:
R. H. EDDY,
E. B. PRATT.